US010799985B2

(12) United States Patent
Cusin et al.

(10) Patent No.: US 10,799,985 B2
(45) Date of Patent: Oct. 13, 2020

(54) TIMEPIECE COMPONENT MADE OF WELDED MATERIALS

(71) Applicant: Nivarox-FAR S.A., Le Locle (CH)

(72) Inventors: Pierre Cusin, Villars-Burquin (CH); Jean-Luc Bazin, Tuescherz-Alfermee (CH)

(73) Assignee: Nivarox-FAR S.A., Le Locle (CH)

(*) Notice: Subject to any disclaimer, the term of this patent is extended or adjusted under 35 U.S.C. 154(b) by 531 days.

(21) Appl. No.: 15/315,599

(22) PCT Filed: May 28, 2015

(86) PCT No.: PCT/EP2015/061774
§ 371 (c)(1),
(2) Date: Dec. 1, 2016

(87) PCT Pub. No.: WO2015/185423
PCT Pub. Date: Dec. 10, 2015

(65) Prior Publication Data
US 2018/0104771 A1 Apr. 19, 2018

(30) Foreign Application Priority Data
Jun. 3, 2014 (EP) .................................. 14171018

(51) Int. Cl.
G04B 17/06 (2006.01)
B23K 26/21 (2014.01)
(Continued)

(52) U.S. Cl.
CPC ............ B23K 26/21 (2015.10); B23K 26/324 (2013.01); B23K 26/352 (2015.10); G04B 1/145 (2013.01);
(Continued)

(58) Field of Classification Search
CPC ...... G04B 1/145; G04B 31/06; G04B 31/004; G04B 17/063; G04B 17/06; G04D 3/00;
(Continued)

(56) References Cited

U.S. PATENT DOCUMENTS 8,662,742 B2 * 3/2014 Damasko ............. G04B 17/063
368/171
8,882,341 B2 * 11/2014 Chu ...................... G04B 17/345
368/177
(Continued)

FOREIGN PATENT DOCUMENTS

CH 707 164 A2 5/2014
EP 1 548 524 A1 6/2005
(Continued)

OTHER PUBLICATIONS

International Search Report dated Nov. 26, 2015 in PCT/EP2015/061774 filed May 28, 2015.
(Continued)

Primary Examiner — Sean Kayes
(74) Attorney, Agent, or Firm — Oblon, McClelland, Maier & Neustadt, L.L.P.

(57) ABSTRACT

A timepiece component includes a first silicon-based or ceramic-based part, and a second metal-based part. One surface of the first part is directly welded using laser-type electromagnetic radiation onto a surface of the second part in order to secure the parts without addition of material. A method for fabrication of a timepiece component for a timepiece includes forming a first silicon-based or ceramic-based part and a second metal-based part, mounting a surface of the first part on a surface of the second part, and welding, using laser-type electromagnetic radiation, the sur-
(Continued)

face of the first part mounted directly on the surface of the second part, in order to secure the parts to each other without addition of material.

10 Claims, 2 Drawing Sheets

(51) Int. Cl.
| | |
|---|---|
| *B23K 26/352* | (2014.01) |
| *G04B 1/14* | (2006.01) |
| *G04B 31/004* | (2006.01) |
| *G04D 3/00* | (2006.01) |
| *B23K 26/324* | (2014.01) |
| *G04B 31/06* | (2006.01) |
| *B23K 103/00* | (2006.01) |

(52) U.S. Cl.
CPC ........... *G04B 31/004* (2013.01); *G04B 31/06* (2013.01); *G04D 3/00* (2013.01); *B23K 2103/52* (2018.08); *G04B 17/063* (2013.01); *G04D 3/0069* (2013.01); *G04D 3/0074* (2013.01)

(58) Field of Classification Search
CPC .... G04D 3/0069; G04D 3/0074; B23K 26/21; B23K 26/352; B23K 26/324; B23K 2103/52
See application file for complete search history.

(56) References Cited

U.S. PATENT DOCUMENTS

| | | | |
|---|---|---|---|
| 10,216,149 B2* | 2/2019 | Winkler | G04B 31/02 |
| 2004/0082145 A1* | 4/2004 | Reichenbach | B29C 65/1683 |
| | | | 438/455 |
| 2005/0136284 A1 | 6/2005 | Grippo et al. | |
| 2006/0055097 A1* | 3/2006 | Conus | G04B 17/066 |
| | | | 267/273 |
| 2007/0133355 A1* | 6/2007 | Hara | C22C 14/00 |
| | | | 368/140 |
| 2008/0217821 A1 | 9/2008 | Goring et al. | |
| 2010/0061192 A1* | 3/2010 | Hessler | G04B 17/06 |
| | | | 368/177 |
| 2013/0004235 A1* | 1/2013 | Chaumat | B23K 1/0008 |
| | | | 403/272 |
| 2013/0070428 A1 | 3/2013 | Kangastupa et al. | |
| 2013/0188461 A1* | 7/2013 | Mallet | G04B 17/063 |
| | | | 368/173 |
| 2017/0227930 A1* | 8/2017 | Di Domenico | G04B 15/14 |
| 2018/0136609 A1* | 5/2018 | Winkler | G04B 43/002 |

FOREIGN PATENT DOCUMENTS

| | | |
|---|---|---|
| EP | 2 579 104 A2 | 4/2013 |
| WO | 03/032377 A1 | 4/2003 |
| WO | 2011/144813 A2 | 11/2011 |

OTHER PUBLICATIONS

Andre Perret, "Le Silicium Comme Materiau Dans La Fabrication De Pieces Mecaniques", Bulletin de la Societe Suisse de Chronometrie, Nov. 9, 2001, No. 38, pp. 27-29, XP002460036.

* cited by examiner

TIMEPIECE COMPONENT MADE OF WELDED MATERIALS

FIELD OF THE INVENTION

The invention relates to a timepiece component made of welded materials and notably such a component comprising a silicon-based or ceramic-based material.

BACKGROUND OF THE INVENTION

Current assemblies including a silicon-based part are generally secured by adhesive bonding. This type of operation requires extremely delicate application which makes it expensive.

There have also been developed silicon-based parts comprising elastic deformation areas to allow for the assembly of said parts. However, depending on the application, adhesive bonding may sometimes still be necessary to maintain a sufficient joining force.

Finally, there have also been developed intermediate parts capable of plastic deformation, intended to be pressed in while protecting the silicon-based part. However, they are not always satisfactory, since, depending on the application, they may be difficult to implement.

SUMMARY OF THE INVENTION

It is an object of the present invention to overcome all or part of the aforementioned drawbacks, by proposing a timepiece component formed from a part comprising a silicon-based or ceramic-based material which is welded using electromagnetic radiation directly onto another part, such as, for example, a metal or a metal alloy.

To this end, according to a first embodiment, the invention relates to a timepiece component comprising a first silicon-based part and a second metal-based part, characterized in that one surface of the first part is welded using laser-type electromagnetic radiation onto a surface of the second part in order to join them.

According to the invention, the first silicon-based part contains single crystal silicon, doped single crystal silicon, polycrystalline silicon, doped polycrystalline silicon, porous silicon, silicon oxide, quartz, silica, silicon nitride or silicon carbide.

According to a second embodiment, the invention relates to a timepiece component comprising a first ceramic-based part and a second metal-based part, characterized in that one surface of the first part is welded using laser-type electromagnetic radiation onto a surface of the second part in order to join them.

According to the invention, the first ceramic-based part contains photostructurable glass, borosilicate, aluminosilicate, quartz glass, zerodur, single crystal corundum, polycrystalline corundum, alumina, aluminium oxide, aluminium nitride, single crystal ruby, polycrystalline ruby, zirconium oxide, titanium oxide, titanium nitride, titanium carbide, tungsten nitride, tungsten carbide, boron nitride or boron carbide.

Advantageously according to the two embodiments of the invention, it is understood that the direct welding of the surfaces makes the joint substantially invisible since the laser type electromagnetic radiation acts directly on the interface between the two parts. Consequently, the timepiece component is of the composite type and it not possible to discern how it was obtained except by destructive inspection. Advantageously according to the invention, already developed parts can thus be used and henceforth joined to each other with improved adherence and a better guarantee of performance over time than with adhesive bonding.

Finally, the ceramic-based or silicon-based parts do not need to have elastic or plastic deformation means to prevent them being broken during assembly since the welding directly joins the surfaces of the ceramic-based or silicon-based parts to the surfaces of the metal-based parts. The immediate advantage in the field of watchmaking is thus clear, both from the point of view of compactness (no additional volume required for elastic or plastic deformation means) and robustness (material-material weld).

According to other advantageous variants of the two embodiments of the invention:

the first silicon-based or ceramic-based part also includes at least a partial coating of silicon oxide, silicon nitride, silicon carbide or an allotrope of carbon;

the first part and/or the second part forms a balance spring, an impulse pin, a balance, a staff, a roller, a pallets, a pallet-staff, a pallet-lever, a pallet-fork, a pallet-stone, a guard-pin, a wheel set, a wheel, an arbor, a pinion, a bar, a plate, an oscillating weight, a winding stem, a bearing or a jewel hole;

the second part includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

Moreover, the invention relates to a timepiece, characterized in that it includes a timepiece component according to any of the preceding variants.

Additionally, the invention also relates to a method for fabrication of a timepiece component according to the first embodiment for a timepiece, comprising the following steps:

forming a first silicon-based part and a second metal-based part;

mounting a surface of the first part on a surface of the second part;

welding, using laser-type electromagnetic radiation, the surface of the first part mounted on the surface of the second part, in order to join or secure them to each other.

Finally, the invention also relates to a method for fabrication of a timepiece component according to the second embodiment for a timepiece, comprising the following steps:

forming a first ceramic-based part and a second metal-based part;

mounting a surface of the first part on a surface of the second part;

welding, using laser-type electromagnetic radiation, the surface of the first part mounted on the surface of the second part, in order to join them to each other.

Advantageously according to the two embodiments of the invention, it is understood that the method is simple, fast and that it is not necessary to add material to join the two materials or to apply a joining force to the first and second parts. Further, laser-type electromagnetic radiation offers great flexibility as regards the location and shape (flat, sloping, non-rectilinear, etc.) of the areas that are to be welded. It is therefore understood that already developed parts can thus be used and henceforth joined to each other with improved adherence and a better guarantee of performance over time than with adhesive bonding.

According to other advantageous variants of the two embodiments of the invention:

the first silicon-based or ceramic-based part also includes at least a partial coating of silicon oxide, silicon nitride, silicon carbide or an allotrope of carbon;

one of the first and second parts is opaque to the wavelength of said laser-type electromagnetic radiation so as to weld said surfaces of the first and second parts when they are one against the other;

an intermediate material is deposited at the interface of the first and second parts when the latter are transparent to the wavelength of said laser-type electromagnetic radiation so as to induce sufficiently intense heating to weld said first and second parts;

the first part and/or the second part forms a balance spring, an impulse pin, a balance, a staff, a roller, a pallets, a pallet-staff, a pallet-lever, a pallet-fork, a pallet-stone, a guard-pin, a wheel set, a wheel, an arbor, a pinion, a bar, a plate, an oscillating weight, a winding stem, a bearing or a jewel hole;

the second part includes an iron alloy, a copper alloy, a nickel alloy, titanium or an alloy thereof, gold or an alloy thereof, silver or an alloy thereof, platinum or an alloy thereof, ruthenium or an alloy thereof, rhodium or an alloy thereof, or palladium or an alloy thereof.

BRIEF DESCRIPTION OF THE DRAWINGS

Other features and advantages will appear clearly from the following description, given by way of non-limiting illustration, with reference to the annexed drawings, in which.

DETAILED DESCRIPTION OF PREFERRED EMBODIMENTS

Figure 1:
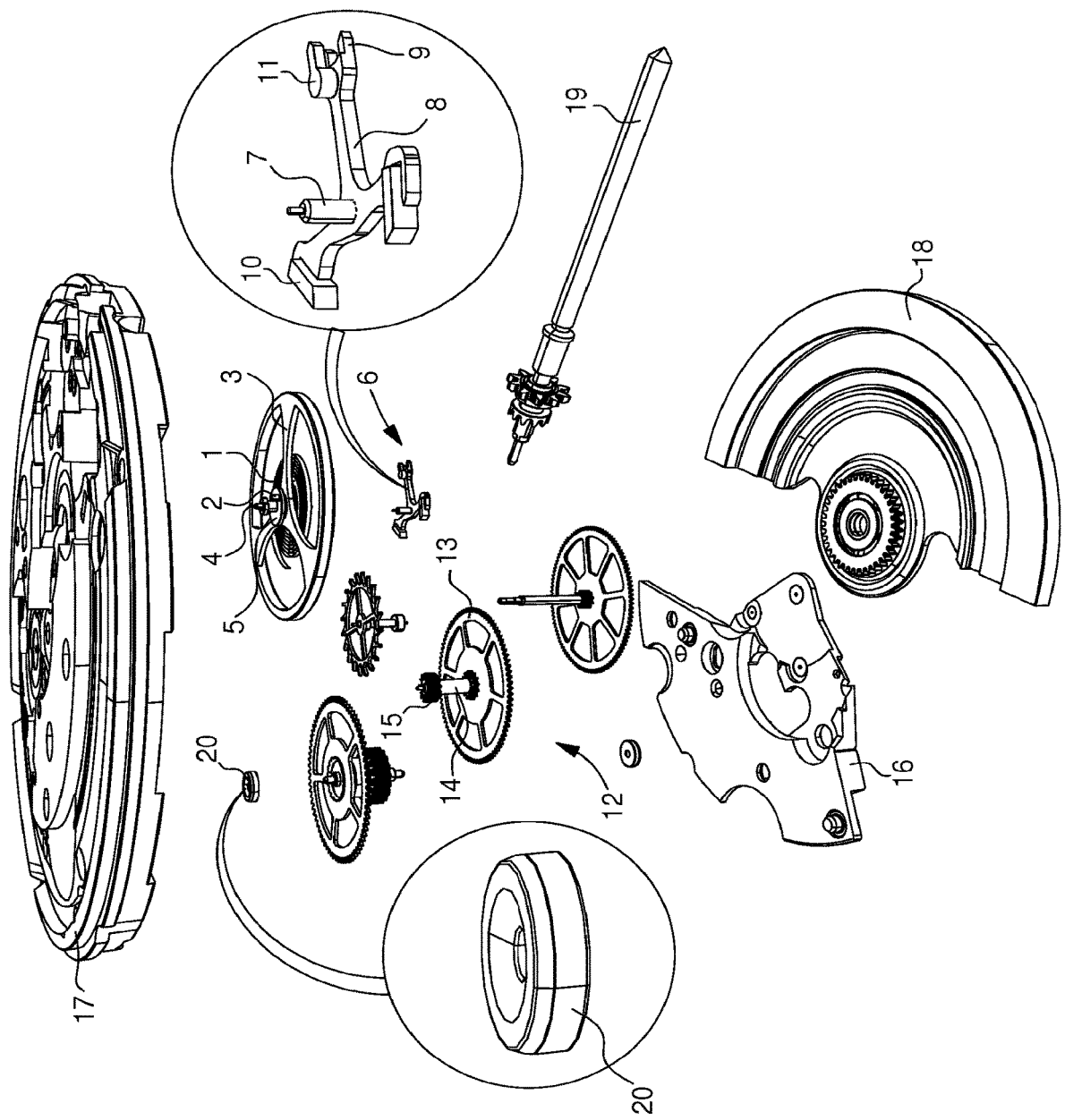
FIG. 1 is a perspective view of timepiece components according to the present invention.

As explained above, the invention relates to a timepiece component formed with the aid of a part whose material has no usable plastic range, i.e. a very limited plastic range, and a second part comprising the same type of material or a different type of material.

This component was devised for applications in the field of horology and is rendered necessary by the increasing part played by brittle materials, such as silicon-based or ceramic-based materials. By way of example, it is possible to envisage forming the balance spring, balance, pallets, bars, oscillating weights or even wheel sets, such as the escape wheels, completely or partially based on brittle materials.

However, always having to use ordinary parts, such as, for example, steel arbors, the fabrication of which is mastered, is a constraint which is difficult to reconcile with the use of parts having no plastic range. Indeed, during testing, it was impossible to press in a steel arbor which systematically broke brittle parts, i.e. those with no usable plastic domain. For example, it was found that the shearing caused by the metal arbor entering the aperture in a single crystal silicon part coated with silicon dioxide systematically breaks the latter.

This is why, according to a first embodiment, the invention relates to a timepiece component comprising a first silicon-based part and a second metal-based part, characterized in that one surface of the first part is welded using laser-type electromagnetic radiation onto a surface of the second part in order to join or secure them to each other.

Advantageously according to the invention, it is understood that it is not necessary to add material in order to join the two parts, as is the case with adhesive bonding or the use of an intermediate part. It is also not necessary to form particular structures in the first part to be able to assemble it in the second part. Thus, by way of example, a simple hole allowing for cooperation with an arbor of corresponding cross-section is sufficient, with the hole formed in the first part or in the second part.

It is therefore understood that already developed parts can thus be used and henceforth welded using laser-type electromagnetic radiation with improved adherence and a better guarantee of performance over time than with adhesive bonding. Finally, the direct welding of the surfaces makes the joint substantially invisible. Indeed, it is sufficient for one of the first and second parts to be opaque and the other transparent to the wavelength of said laser-type electromagnetic radiation in order to weld said surfaces of the first and second parts when they are one against the other. Such welding using laser-type electromagnetic radiation is, for example, explained in EP Patent 1436830, which is incorporated by reference in the present description. Further, as explained in EP Patent 1436830, if the first and second parts are transparent to the wavelength of said laser-type electromagnetic radiation, optionally, an intermediate material intended to enhance the joint between the two materials may be used. Thus, the intermediate material forms a layer intended to induce sufficiently intense heating to cause the fusion of the two materials.

According to the first embodiment, the first silicon-based part preferably includes single crystal silicon, doped single crystal silicon, polycrystalline silicon, doped polycrystalline silicon, porous silicon, silicon oxide, quartz, silica, silicon nitride or silicon carbide. Further, the first silicon-based part may also optionally include at least a partial coating of silicon oxide, silicon nitride, silicon carbide or an allotrope of carbon, depending upon the intended applications of the timepiece component.

According to a second embodiment, the invention relates to a timepiece component comprising a first ceramic-based part and a second metal-based part, characterized in that one surface of the first part is welded using laser-type electromagnetic radiation onto a surface of the second part in order to join them.

Advantageously according to the invention, it is understood that it is not necessary to add material in order to join the two parts, as is the case with adhesive bonding or the use of an intermediate part. It is also not necessary to form particular structures in the first part to be able to assemble it in the second part. Thus, by way of example, a simple hole allowing for cooperation with an arbor of corresponding cross-section is sufficient, with the hole formed in the first part or in the second part.

It is therefore understood that already developed parts can thus be used and henceforth welded using laser-type electromagnetic radiation with improved adherence and a better guarantee of performance over time than with adhesive bonding. Finally, the direct welding of the surfaces makes the joint substantially invisible. Indeed, it is sufficient for one of the first and second parts to be opaque and the other transparent to the wavelength of said laser-type electromagnetic radiation in order to weld said surfaces of the first and second parts when they are one against the other; Such welding using laser-type electromagnetic radiation is, for example, explained in EP Patent 1436830, which is incorporated by reference in the present description. Further, as explained in EP Patent 1436830, if the first and second parts are transparent to the wavelength of said laser-type electromagnetic radiation, optionally, an intermediate material intended to enhance the joint between the two materials may be used. Thus, the intermediate material forms a layer intended to induce sufficiently intense heating to cause the fusion of the two materials.

According to the second embodiment, the first ceramic-based part preferably contains photostructurable glass, borosilicate, aluminosilicate, quartz glass, zerodur, single crystal corundum, polycrystalline corundum, alumina, aluminium oxide, aluminium nitride, single crystal ruby, polycrystalline ruby, zirconium oxide, titanium oxide, titanium nitride, titanium carbide, tungsten nitride, tungsten carbide, boron nitride or boron carbide. Further, the first ceramic-based part may also optionally include at least a partial coating of silicon oxide, silicon nitride, silicon carbide or an allotrope of carbon, depending upon the intended applications of the timepiece component.

According to the two embodiments, the second part preferably includes an iron alloy like 15P, 20AP or 316L steel, a copper alloy such as brass, a nickel alloy such as nickel silver, titanium or an alloy thereof, gold or an alloy thereof, silver or an alloy thereof, platinum or an alloy thereof, ruthenium or an alloy thereof, rhodium or an alloy thereof, or palladium or an alloy thereof.

According to the two embodiments of the invention, the first part and/or the second part may form a large variety of timepiece components for a timepiece. By way of non-limiting example and with reference to FIG. 1, the first part and/or the second part may thus notably form a balance spring 1, an impulse pin 2, a balance 3, a staff 4, a roller 5, a pallets 6 such as a pallet-staff 7, a pallet-lever 8, a pallet-fork 9, a pallet-stone 10 and a guard-pin 11, a wheel set 12 such as a wheel 13, an arbor 14 and a pinion 15, a bar 16, a plate 17, an oscillating weight 18, a winding stem 19 or a jewel hole 20.

Figure 2:
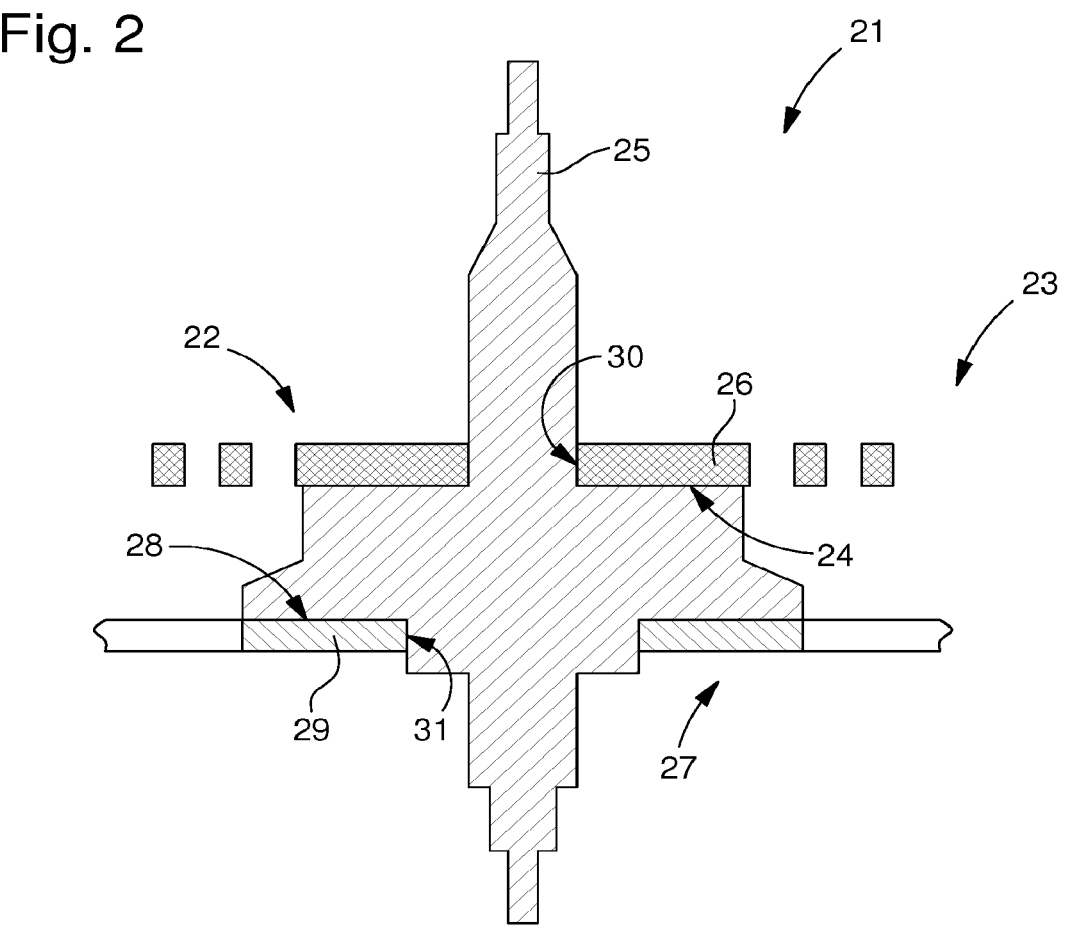
FIG. 2 is a cross-section of a timepiece component according to the invention.

By way of example, FIG. 2 shows a timepiece component 21 forming a sprung balance resonator 23 mounted to rotate on a staff 25. Balance spring 21 comprises a strip extending over several coils and is mounted on a first shoulder 24 of staff 25 by means of a collet 26. Balance 27 is mounted on a second shoulder 28 of staff 25 by means of a hub 29.

It is thus understood, for example, that staff 25 can be welded using electromagnetic radiation, such as a laser, directly at shoulders 24, 28, and/or cylindrical surfaces 30, 31, respectively against balance spring 22 and/or balance 27. It is sufficient for either staff 25, or balance spring 22 and/or balance 27 to be transparent to the wavelength of said laser-type electromagnetic radiation in order to weld the contact surfaces. Of course, other types of contact surface may be provided, such as sloping surfaces or non-rectilinear surfaces.

The present invention is not limited to the illustrated example but is capable of various variants and modifications which will appear to those skilled in the art. In particular, the second part may be made of a type of material other than a metal or a metal alloy. Thus, in a non-limiting manner, the second part may also be made of the same material as the first part, of ceramic or of a semiconductor material.

However, in that case, as explained in EP Patent 1436830, if the first and second parts are transparent to the wavelength of said laser-type electromagnetic radiation, optionally, an intermediate material intended to enhance the joint between the two materials must be used. Indeed, this intermediate material would then form a layer intended to induce sufficiently intense heating to cause the fusion of the two materials transparent to the wavelength of said laser-type electromagnetic radiation.

As explained above, the first part and/or the second part may form a variety of timepiece components. By way of additional examples in FIG. 2, a pallets 6 could be formed from a first part forming pallet-lever 8, pallet-stones 10 and pallet-fork 9, and from a first second part forming staff 7 and a second second part forming guard-pin 11. A wheel set 12 could be formed from a first part forming an arbor 14 and a pinion 15, and from a second part forming a wheel 13. A resonator assembly could be formed from a first part forming a case provided with a cavity, from a first second part forming a tuning fork resonator and a second second part forming the cover enclosing the resonator in the case.

Moreover, a first part could form a roller 5 and be joined to a second part forming an impulse pin 2, a first part could form a plate 17 or a bar 16 and be joined to several second parts forming jewel holes 20, or a first part could form an oscillating weight 18 and be joined to a second part forming a bearing cage.

Finally, said optional at least a partial coating is not limited to silicon oxide, silicon nitride, silicon carbide or an allotrope of carbon. Thus, depending on the intended applications of the timepiece component, other materials may be envisaged, in order, for example, to improve the tribological, thermal or visual qualities of the timepiece component. By way of example, at least a partial thermal compensation coating may be deposited.

The invention claimed is:

1. A sprung balance resonator, comprising:
   a first silicon-based part and a second metal-based part,
   wherein a surface of the first part is directly welded using laser-type electromagnetic radiation onto a surface of the second part such that the parts are secured to each other without adhesive therebetween,
   wherein the first silicon-based part further includes at least a partial coating of silicon oxide, silicon nitride, silicon carbide, or an allotrope of carbon.

2. The sprung balance resonator according to claim 1, wherein the first silicon-based part includes single crystal silicon, doped single crystal silicon, polycrystalline silicon, doped polycrystalline silicon, porous silicon, silicon oxide, quartz, silica, silicon nitride, or silicon carbide.

3. The sprung balance resonator according to claim 1, wherein the first part and/or the second part forms a balance spring, an impulse pin, a balance, a staff, a roller, a pallets, a pallet-staff, a pallet-lever, a pallet-fork, a pallet-stone, a guard-pin, a wheel set, a wheel, an arbor, a pinion, a bar, a plate, an oscillating weight, a winding stem, a bearing or a jewel hole.

4. The sprung balance resonator according to claim 1, wherein the second part includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

5. A method for fabrication of a sprung balance resonator for a timepiece, comprising:
   forming a first silicon-based part and a second metal-based part;
   mounting a surface of the first part on a surface of the second part; and
   welding, using laser-type electromagnetic radiation, the surface of the first part mounted directly on the surface of the second part, such that the parts are secured to each other without adhesive therebetween, wherein the first silicon-based part further includes at least a partial coating of silicon oxide, silicon nitride, silicon carbide, or an allotrope of carbon.

6. The method according to claim 5, wherein the first silicon-based part includes single crystal silicon, doped single crystal silicon, polycrystalline silicon, doped polycrystalline silicon, porous silicon, silicon oxide, quartz, silica, silicon nitride or silicon carbide.

7. The method according to claim 5, wherein one of the first and second parts is opaque to a wavelength of the laser-type electromagnetic radiation in order to weld the surfaces of the first and second parts when the surfaces are one against the other.

8. The method according to claim 5, wherein an intermediate material is deposited at an interface of the first and second parts when the latter are transparent to a wavelength of the laser-type electromagnetic radiation so as to induce sufficiently intense heating to weld the first and second parts.

9. The method according to claim 5, wherein the first part and/or the second part forms a balance spring, an impulse pin, a balance, a staff, a roller, a pallets, a pallet-staff, a pallet-lever, a pallet-fork, a pallet-stone, a guard-pin, a wheel set, a wheel, an arbor, a pinion, a bar, a plate, an oscillating weight, a winding stem, a bearing or a jewel hole.

10. The method according to claim 5, wherein the second part includes an iron alloy, a copper alloy, nickel or an alloy thereof, titanium or an alloy thereof, gold or an alloy thereof, silver or an alloy thereof, platinum or an alloy thereof, ruthenium or an alloy thereof, rhodium or an alloy thereof, or palladium or an alloy thereof.

\* \* \* \* \*